Feb. 8, 1955 P. B. KELLER ET AL Re. 23,939

DIMPLING APPARATUS

Original Filed May 24, 1944

INVENTORS.
J. B. Bolte and P. B. Keller
BY Carlos G. Stratton
ATTORNEY

United States Patent Office

Re. 23,939

Reissued Feb. 8, 1955

23,939

DIMPLING APPARATUS

Philip B. Keller, Los Angeles, and Frank B. Bolte, Long Beach, Calif., assignors, by mesne assignments, to Martool, Inc., South Gate, Calif., a corporation of California Original No. 2,441,790, dated May 18, 1948, Serial No. 537,078, May 24, 1944. Application for reissue September 15, 1954, Serial No. 456,896

18 Claims. (Cl. 153—21)

Matter enclosed in heavy brackets [ ] appears in the original patent but forms no part of this reissue specification; matter printed in italics indicates the additions made by reissue.

Our invention relates to a dimpling apparatus.

An important object of our invention is to obtain desired angularity between a dimple and the adjacent surface in metal work material, but still retain the dimensional requirements therefor.

Still another object is to obtain the same angularity, top and bottom, in dimpled work material, so as to be able to nest or mate dimpled sheets, one within the other.

A still further object is to provide a process of dimpling material which prevents stretching, thinning or cracking of the work material when dimpling or countersinking same, and especially when using hard alloys.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Figure 2:
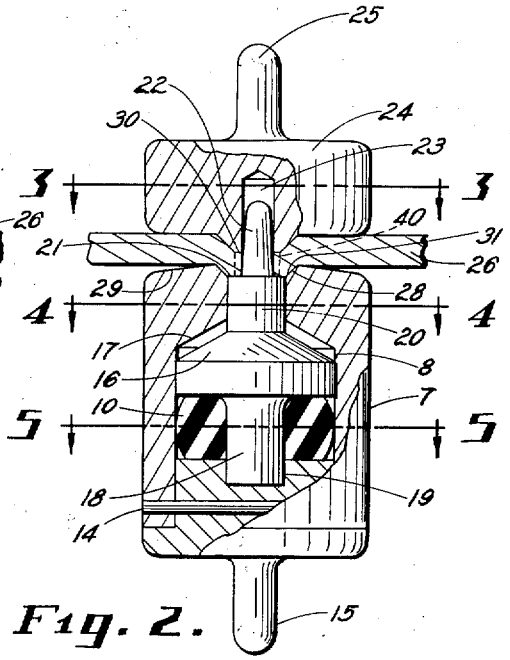
Fig. 2 is a view similar to Fig. 1, but showing the dimpling set at the end of the dimpling operation.
Figure 3:
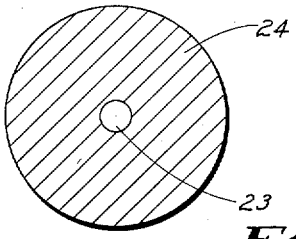
Figure 4:
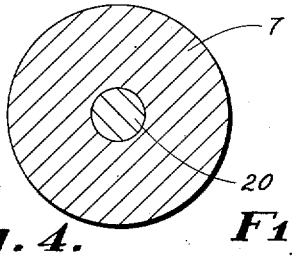
Figure 5:
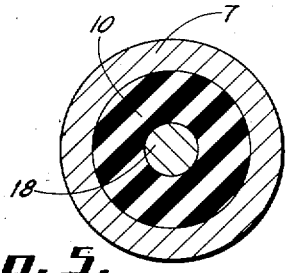

Figs. 3, 4 and 5 are cross-sectional views taken on the lines 3—3, 4—4 and 5—5 respectively of Fig. 2, looking in the direction of the arrows.

Figure 6:
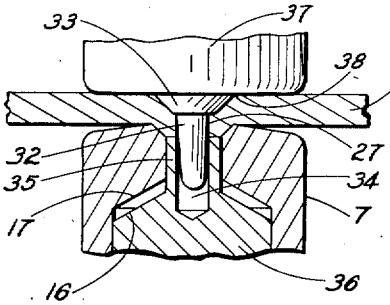

Fig. 6 is a vertical, broken section through a modified construction of a dimpling set.

Figure 7:
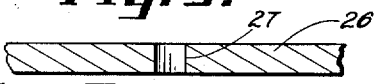

Fig. 7 is a sectional view of work material after it has been drilled but before it has been dimpled.

Figure 8:
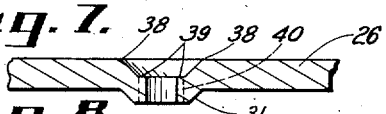

Fig. 8 is a sectional view of the work material at an intermediate point in the present process.

Figure 9:
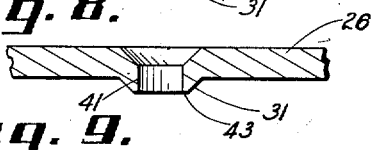

Fig. 9 is a sectional view of the completed work material.

Referring more in detail to the drawings, the reference number 7 generally designates a dimpling die used in carrying out our process. The die has a cavity 8 therein in which reciprocates a pressure ram 9. An elastic ram return 10 is disposed in the cavity 8 between the ram 9 and the opposed face 12 of a plug 13, which is pinned in the lower open end of the die 7. The pin is illustrated at 14. The plug 13 has a depending finger 15 for insertion in a bed of a press (not shown). The normally upper shoulder 16 of the pressure ram 9, is tapered and shaped to conform with the internally tapering face 17 in the die 7. The pad 10 tends to move the ram 9 upwardly in Fig. 1, to seat the shoulder 16 against the tapering face 17.

The ram 9 has a depending pin 18 that reciprocates in a recess 19 in the plug 13. Projecting upwardly from the shouldered end 16, the ram 9 has a head 20 provided with a coining face 21 in the central portion of which upwardly extends a pilot 22. The pilot 22 reciprocates in a recess 23 in a dimpling punch 24. The pilot 22 tends to maintain the dimpling punch and dimpling die in alinement with each other. The punch 24 also has a finger 25 for engagement with the actuating head (not shown) of the press.

The die 7 has a countersink 28 centrally located with respect to a slightly downwardly inclined surrounding face 29. The face 29 preferably is disposed at a slight angle downward from the countersink 28, such as at a two degree (2 deg.) angle. The punch 24 has a downwardly depending pressure ring 30 of the same contour as the countersink 28.

Fig. 6 illustrates a construction in which the pilot 32 is mounted in a downward direction upon the pressure ring 33 of the dimpling punch 37. The recess 34 for the pilot is, moreover, in the head 35 of the ram 36. In Fig. 6, the die 7 and punch 37 are otherwise similar to the corresponding parts in Figs. 1 and 2.

In carrying out our present process, the work material 26 is first drilled with an undersized bore 27 that is smaller in diameter than the bore 41 in the finished product.

Figure 1:
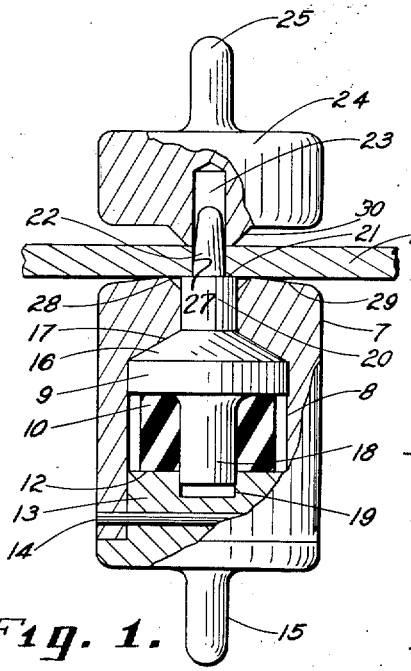
Fig. 1 is a vertical section, partly in elevation, showing a dimpling set at the beginning of the dimpling operation in the present process.

The bored work material 26 is inserted between the punch 24 and die 7, with the pilot 22 engaging the bore 27, as shown in Fig. 1. Downward driving action upon the punch 24 causes the pressure ring 30 to downwardly dimple the work material, as indicated at 31. Downward dimpling of the material around the bore 27 is yieldingly resisted by the coining face 21 on the head 20. Downward movement of the ram 9 is progressively resisted by the resilient pad 10.

Downward dimpling of the work material would ordinarily cause a stretching and thinning of the material at the bend 38 and cause different angularity on the top and bottom of the work material. To prevent this in the present process, the material 39 between the lower end of the pressure ring 30 and the opposed portion of the coining face 21 (indicated by the broken lines 40 in Figs. 2 and 8) is extruded outwardly from the hole 27 by reason of the pilot 22 preventing inward extrusion of the material, thereby effecting the present coining operation. As a result, the extruded material cold flows back up the incline, between the pressure ring 30 and the countersink 28, thus counteracting the tendency to thin at the bend 38 and maintaining the same angularity, top and bottom, on the material. The excess material provided by the undersized hole 27 is utilized to maintain said results.

Then to complete the dimple 31, the thinned portion 39 is drilled out leaving the finished bore 41 through the dimple 31. The slight downward angle of the face 29 permits a slight spring back of the material. This gives a small amount of coining action to the sheet adjacent the dimple. It also relieves tension stresses on the upper surfaces of the sheet, thereby insuring a clean, sharp dimple. Moreover, the finished dimple has a flat undersurface 43, to provide a bearing surface for the upset end of a rivet.

It is believed clear without further illustration that the present dimpling tools may be used in either squeeze type machines or with portable guns and bucking bars. What is necessary is that the inertia of the dimpling die and pressure ram, combined with the yielding resistance of the ram return cushion 10, be of sufficient magnitude to effect coining.

Fig. 2 illustrates how, in the final stage of operation, the pin 18 may bottom against the plug 13 in order to change the resistance of the ram 9 from a yielding to an unyielding resistance, thereby increasing the coining pressure applied by the coining face for the final stage of coining in which the entire area of the dimple is coined. Obviously, the bottoming may be attained by providing for the resistance of the cushion 10 to increase to a substantially unyielding magnitude (as by having the cushion deform to the point of substantially filling the cavity containing it).

It is believed clear without further explanation, that the process utilizing the tool of Fig. 6 is similar to that just described.

While we have illustrated and described what we now regard as the preferred embodiments of our invention, the constructions are, of course, subject to modifications without departing from the spirit and scope of our invention. We, therefore, do not wish to restrict ourselves to the particular forms of construction illustrated and described but desire to avail ourselves of all modifications that may fall within the scope of the appended claims.

Having thus described our invention, what we claim and desire to secure by Letters Patent is:

1. An apparatus for forming dimples around an opening, comprising a die element having a frusto-conical countersink, a member operable axially through and relatively to said countersink and provided with a coining face and a pilot, compression means resisting the relative movement of said member, and a frusto-conical punch substantially equal in dimension to said countersink, said punch operable to compress material about said pilot and cause it to flow into said countersink to coin a dimple, with a wall of uniform thickness and flattened at the bottom, said punch having a bore axially alined with said pilot to receive same during the dimple forming operation.

2. An apparatus for forming dimples around an opening, comprising a die element having a frusto-conical countersink, a member within said element operable axially through said countersink and provided with a coining face and a pilot, means in said element resisting the relative movement of said member and normally holding the coining face of said member projected above the bottom of said countersink, and a complementary die element comprising a frusto-conical compression member equal in dimension to the countersink in said first-named die element, said compression member operable to compress the material about said pilot into said countersink and against said coining face to coin a dimple in the material.

3. In a machine for forming a dimple around an opening in a sheet of coinable material, in which machine there is embodied a resilient means for applying yielding pressure, the combination of: a die element having a frusto-conical countersink, an element reciprocable in said die element, having a head coaxial with said countersink and formed with a coining face, said resilient means engaging said headed element, normally to hold said head projected above the bottom of said countersink, a complementary die element having a frusto-conical punch and, at the end of said punch an annular coining face opposed to the first-mentioned coining face, one of the coining face bearing elements having a pilot projecting axially from the coining face thereof and adapted to pass through a perforation in a sheet of material to be dimpled and be received in a bore in the other coining face bearing element, said punch being operable to compress the material about said pilot into said countersink and between said coining faces to coin a dimple in the material.

4. Apparatus for forming a dimple around an opening in a sheet of metal, comprising a die element having a frusto-conical countersink, an element operable axially through and relative to said countersink and provided with a coining face, yielding means confined within said die element and engaged between said die element and said axially operable member, and a cooperating die element having a frusto-conical punch that is provided at its ends with a coining face opposed to the coining face of said axially operable element, one of the coining face bearing elements having a pilot projecting axially therefrom and the other of the coining face bearing elements having a bore to receive said pilot, said punch being operable to compress the material about said pilot and cause it to flow into said countersink to coin a dimple that is flattened at the bottom.

5. Apparatus for forming a dimple around an opening in a sheet of coinable material, comprising a female die element having a frusto-conical countersink and having, surrounding said countersink, an end face that is convexly frusto-conical, with a high area thereof immediately adjacent the countersink providing a coining shoulder, and a male die element having a frusto-conical punch conforming in shape, angularity and dimension to the countersink and having, surrounding said punch, a substantially flat end surface, said die elements being cooperable to coin in the area of said sheet surrounding said opening, a dimple having a wall of uniform thickness merging with said sheet through a sharply defined angle whereby dimples of stacked sheets will nest with each other.

6. Apparatus as defined in claim 5, wherein one of said die elements has a pilot and the other of said die elements has a bore in which said pilot is receivable, said pilot functioning to resist inward flow of the metal during the coining operation and to thereby inhibit the formation of strains in the metal adjacent the opening.

7. Apparatus for forming a dimple around an opening in a sheet of coinable material, comprising a die element having a frusto-conical countersink, an element reciprocable axially in said countersink and having an exposed end providing a coining face, means yieldingly acting against said reciprocable element, to hold said coining face normally projected above the bottom of said countersink, and a complementary die element having a frusto-conical punch conforming in dimensions and shape to the countersink, one of the two last mentioned elements having a pilot projecting axially therefrom and adapted to pass through said opening and be received in a bore in the other of said two elements, said punch being operable to compress the material about said pilot into said countersink and against said coining face whereby to effect coining of the entire area of the material embraced between said punch and countersink to produce therein a fully coined dimple adapted to fully nest with a like dimple in another sheet.

8. In a machine for forming a dimple around an opening in a sheet of coinable material, including resilient means: the combination of a female die element having a frusto-conical countersink and having, surrounding said countersink, an end surface that is convexly frusto-conical, with a high area thereof immediately adjacent the countersink providing a coining shoulder, and a male die element having a frusto-conical punch conforming in shape and dimensions to the countersink and having, surrounding said punch, a substantially flat end surface diverging outwardly with reference to said frusto-conical surface, and an element reciprocable axially in said countersink and having an exposed end providing a coining face, normally projected above the bottom of said countersink, for yieldingly engaging the sheet immediately adjacent said opening and applying pressure thereto in an initial stage of operation of the machine, and arranged to receive yielding pressure from said resilient means, said elements being cooperable to coin in the area of said sheet surrounding said opening, a dimple having a wall of uniform thickness merging with said sheet through a sharply defined angle whereby dimples of stacked sheets will nest with each other.

9. In a machine for forming a dimple around an opening in a sheet of coinable material, including resilient means: the combination of a female die element having a frusto-conical countersink and having, surrounding said countersink, an end surface that is convexly frusto-conical, with a high area thereof immediately adjacent the countersink providing a coining shoulder, a male die element having a frusto-conical punch conforming in shape, angularity and dimensions to the countersink and having, surrounding said punch, a substantially flat end surface that diverges outwardly from said end surface, and an element reciprocable in said countersink, having a head coaxial with said countersink and formed with a coining face normally projected above the bottom of the countersink to yieldingly engage the area of said sheet immediately adjacent said opening and apply pressure thereto in an initial stage of operation of the machine, and arranged to receive yielding pressure from said resilient means, one of said elements having a pilot projecting axially from the coining face thereof, and adapted to pass through said opening and be received in a bore in another of said elements, said punch being operable to compress the material about said pilot into said countersink and between said coining faces to coin a dimple in the material.

10. Means for forming a dimple around a hole in sheet material comprising a male die having a projecting die face, a female die element having a die recess complementary to said projecting die face, a tubular gripping member movably mounted in said female die having an outer end disposed in the mid-portion of, and having a smaller transverse dimension than, said recess, said gripping member being adapted to engage the sheet material immediately adjacent to said hole, and resilient means for urging said outer end of said gripping member out of said recess.

11. Dimple forming means as defined in claim 10, wherein said female die element has a cavity of greater diameter than said tubular gripping member, a bore in which said shoulder is slidable, and an off-set shoulder between said bore and the lateral wall of said cavity; wherein said tubular gripping member has an enlarged head reciprocable in said cavity and adapted to engage said shoulder to limit the projection of the gripping member; and wherein said resilient means comprises a yielding cushion of material having the characteristics of rubber, disposed within said cavity and engaged under compression between said female die element and said head.

12. Dimple forming means as defined in claim 10, wherein said female die element has a cavity of larger diameter than said gripping member, a bore in which said gripping member is slidable, and an off-set shoulder connecting the lateral wall of said cavity to said bore; wherein said gripping member has an enlarged head reciprocable in said cavity and a stem that is slidable in a bore in the end of said female die element and adapted to bottom in said bore so as to provide unyielding resistance at the end of the relative movement of the die elements; and wherein said resilient means comprises an annular cushion of yielding material having the characteristics of rubber, disposed within said cavity between said head and the bottom of said female die element, said stem passing through said annular cushion and the periphery of said annular cushion being normally spaced from the lateral wall of said cavity.

13. In a machine for forming a dimple around a hole in sheet material, in which machine there is embodied a resilient means for applying yielding pressure, the combination of: a male die having a projecting die face; a female die having a die recess complementary to said projecting die face; a gripping member movably mounted in said female die, having an outer gripping end disposed in the mid-portion of, and having a smaller transverse dimension than, said recess, said gripping member being adapted to engage the sheet material immediately adjacent to said hole, and being arranged to transmit yielding pressure from said resilient means to said sheet material, the outer end of said gripping member being normally urged out of said recess by said resilient means.

14. Dimple forming means as defined in claim 13, wherein said gripping member is tubular and including a pilot carried by the male die and receivable within said tubular gripping member and adapted to fit snugly therein.

15. In a machine for forming a dimple around an opening in a sheet of coinable material, in which machine there is embodied a resilient means for applying yielding pressure, the combination of: a die element having a frusto-conical countersink, an element reciprocal axially in said countersink and having an exposed coining face, normally projected above the bottom of said countersink for yieldingly engaging the sheet immediately adjacent said opening and applying pressure thereto in an initial stage of operation of the machine, said element being arranged to receive yieding pressure from said resilient means, and a complementary die element having a frusto-conical punch conforming in dimensions and shape to the countersink, one of the two last mentioned elements having a pilot projecting axially therefrom and adapted to pass through said opening and be received in a bore in the other of said two elements, said punch being operable to compress the material about said pilot into said countersink and against said coining face whereby to effect coining of the entire area of the material embraced between said punch and countersink to produce therein a fully coined dimple adapted to fully mesh with a liquid dimple in an undersheet.

16. A machine as defined in claim 15, including means against which said reciprocal element is arranged to bottom in order to provide substantially unyielding resistance to pressure exerted through the sheet, in a final stage of operation of the machine.

*17. Apparatus for forming a dimple around an opening in a sheet of coinable material, comprising a die element having a frusto-conical countersink, and element reciprocable axially in said countersink and having an exposed end providing a flat coining face, means yieldingly acting against said reciprocable element, to hold said coining face normally projected above the bottom of said countersink, and a complementary die element having a frusto-conical punch conforming in dimensions and shape to the countersink, one of the two last mentioned elements having a pilot projecting axially therefrom and adapted to pass through said opening and be received in a bore in the other of said two elements, said punch being operable to compress the material about said pilot into said countersink and against said coining face whereby to effect coining of the entire area of the material embraced between said punch and countersink to produce therein a fully coined dimple adapted to fully nest with a like dimple in another sheet.*

*18. Apparatus for forming a dimple around an opening in a sheet of coinable material, comprising a die element having a frusto-conical countersink, an element reciprocable axially in said countersink and having an exposed end providing a coining face disposed in a plane normal to the longitudinal axis of said element, means yieldingly acting against said reciprocable element, to hold said coining face normally projected above the bottom of said countersink, and a complementary die element having a frusto-conical punch conforming in dimensions and shape to the countersink, one of the two last mentioned elements having a pilot projecting axially therefrom and adapted to pass through said opening and be received in a bore in the other of said two elements, said punch being operable to compress the material about said pilot into said countersink and against said coining face whereby to effect coining of the entire area of the material embraced between said punch and countersink to produce therein a fully coined dimple adapted to fully nest with a like dimple in another sheet.*

References Cited in the file of this patent or the original patent

UNITED STATES PATENTS

| | | |
|---|---|---|
| 2,114,289 | Draim | Apr. 19, 1938 |
| 2,288,378 | Veit | June 30, 1942 |
| 2,292,446 | Huck | Aug. 11, 1942 |
| 2,302,772 | Huck | Nov. 24, 1942 |
| 2,333,418 | Fischer | Nov. 2, 1943 |
| 2,348,875 | Beard | May 16, 1944 |
| 2,356,526 | Mayer et al. | Aug. 22, 1944 |
| 2,365,918 | Tuttle | Dec. 26, 1946 |
| 2,418,736 | Styes | Apr. 8, 1947 |

FOREIGN PATENTS

| | | |
|---|---|---|
| 155,204 | Great Britain | Jan. 12, 1922 |
| 454,733 | Great Britain | Oct. 7, 1936 |
| 485,405 | Great Britain | May 19, 1938 |